United States Patent
DiNatale et al.

(10) Patent No.: US 12,279,020 B2
(45) Date of Patent: Apr. 15, 2025

(54) DYNAMIC UPDATE SYSTEM FOR A REMOTE PHYSICAL DEVICE

(71) Applicant: ARRIS Enterprises LLC, Suwanee, GA (US)

(72) Inventors: John DiNatale, Pembroke, MA (US); Steve Schroeder, Franklin, MA (US); Peter Walter, Walpole, MA (US); Kumara Swamy Tadikavagilu Venkatappa, Bengaluru (IN); Dave Padula, East Walpole, WA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/386,054

(22) Filed: Nov. 1, 2023

(65) Prior Publication Data

US 2024/0137623 A1    Apr. 25, 2024
US 2024/0236440 A9    Jul. 11, 2024

Related U.S. Application Data

(63) Continuation of application No. 17/829,948, filed on Jun. 1, 2022, now abandoned.

(60) Provisional application No. 63/195,529, filed on Jun. 1, 2021.

(51) Int. Cl.
*H04N 21/65* (2011.01)

(52) U.S. Cl.
CPC .................................. *H04N 21/65* (2013.01)

(58) Field of Classification Search
CPC ... H04N 21/65; H04N 21/654; H04N 21/6547
See application file for complete search history.

(56) References Cited

U.S. PATENT DOCUMENTS

| 8,560,823 | B1 | 10/2013 | Aytek et al. |
| 10,635,428 | B2 | 4/2020 | Nidumolu |
| 11,385,903 | B2 | 7/2022 | Xie et al. |
| 2004/0015857 | A1* | 1/2004 | Cornelius ........... H04L 41/0823 714/E11.026 |

(Continued)

FOREIGN PATENT DOCUMENTS

EP    3407187 A1 *  11/2018   ............. G06F 13/20

OTHER PUBLICATIONS

DVB Organization: "CM-SP-R_PHY-I01_150615.pdf", DVB, Digital Video Broadcasting, C/O EBU—17A Ancienne Route—CH-1218 Grand Saconnex, Geneva—Switzerland, Jun. 15, 2015 (Jun. 15, 2015), published by Cable Television Laboratories, Inc., XP017847450, pp. 47-51.

(Continued)

*Primary Examiner* — Joshua D Taylor
(74) *Attorney, Agent, or Firm* — Chernoff, Vilhauer, McClung & Stenzel, LLP

(57) ABSTRACT

A method for updating an embedded device that includes a processor that receives an image file including at least one of kernel software, hardware configuration data, and application software. The embedded device parses the image file to determine portions of the image file that have been indicated by at least one flag as being modified from that currently being included on the embedded device. The embedded device installing at least portions of the image file on the embedded device and resetting portions of the embedded device based upon the at least one flag.

14 Claims, 7 Drawing Sheets

(56) References Cited

U.S. PATENT DOCUMENTS

| | | | |
|---|---|---|---|
| 2006/0259642 A1 | 11/2006 | Du et al. | |
| 2012/0023528 A1* | 1/2012 | Mathews | H04L 65/80 |
| | | | 725/91 |
| 2012/0079474 A1 | 3/2012 | Gold et al. | |
| 2013/0051314 A1* | 2/2013 | Ong | H04L 41/0661 |
| | | | 370/328 |
| 2014/0282470 A1* | 9/2014 | Buga | G06F 8/65 |
| | | | 717/170 |
| 2016/0352613 A1* | 12/2016 | Narayanan | H04L 45/021 |
| 2018/0062956 A1* | 3/2018 | Schultz | H04L 41/0806 |
| 2019/0042583 A1 | 2/2019 | Tierney et al. | |
| 2019/0058631 A1* | 2/2019 | Zhou | H04L 47/50 |
| 2019/0303129 A1* | 10/2019 | Nidumolu | H04L 45/563 |

OTHER PUBLICATIONS

International Search Report and Written Opinion RE: Application No. PCT/US2022/31816, dated Aug. 24, 2022.

* cited by examiner

DYNAMIC UPDATE SYSTEM FOR A REMOTE PHYSICAL DEVICE

CROSS REFERENCE TO RELATED APPLICATIONS

This application is a continuation of U.S. patent application Ser. No. 17/829,948 filed Jun. 1, 2022, which claims the benefit of U.S. Provisional Patent Application Ser. No. 63/195,529 filed Jun. 1, 2021.

BACKGROUND

The subject matter of this application relates to efficient remote-phy dataplane management for a cable system.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))-video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
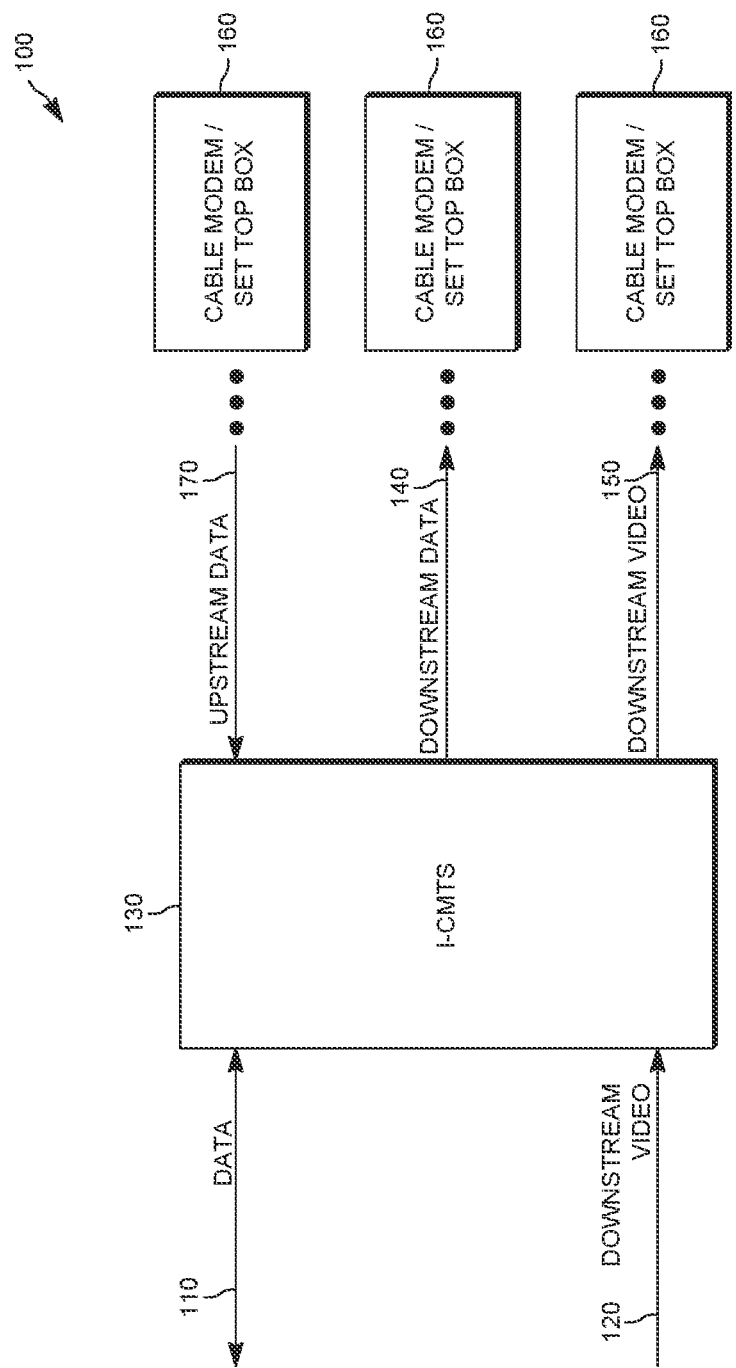
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
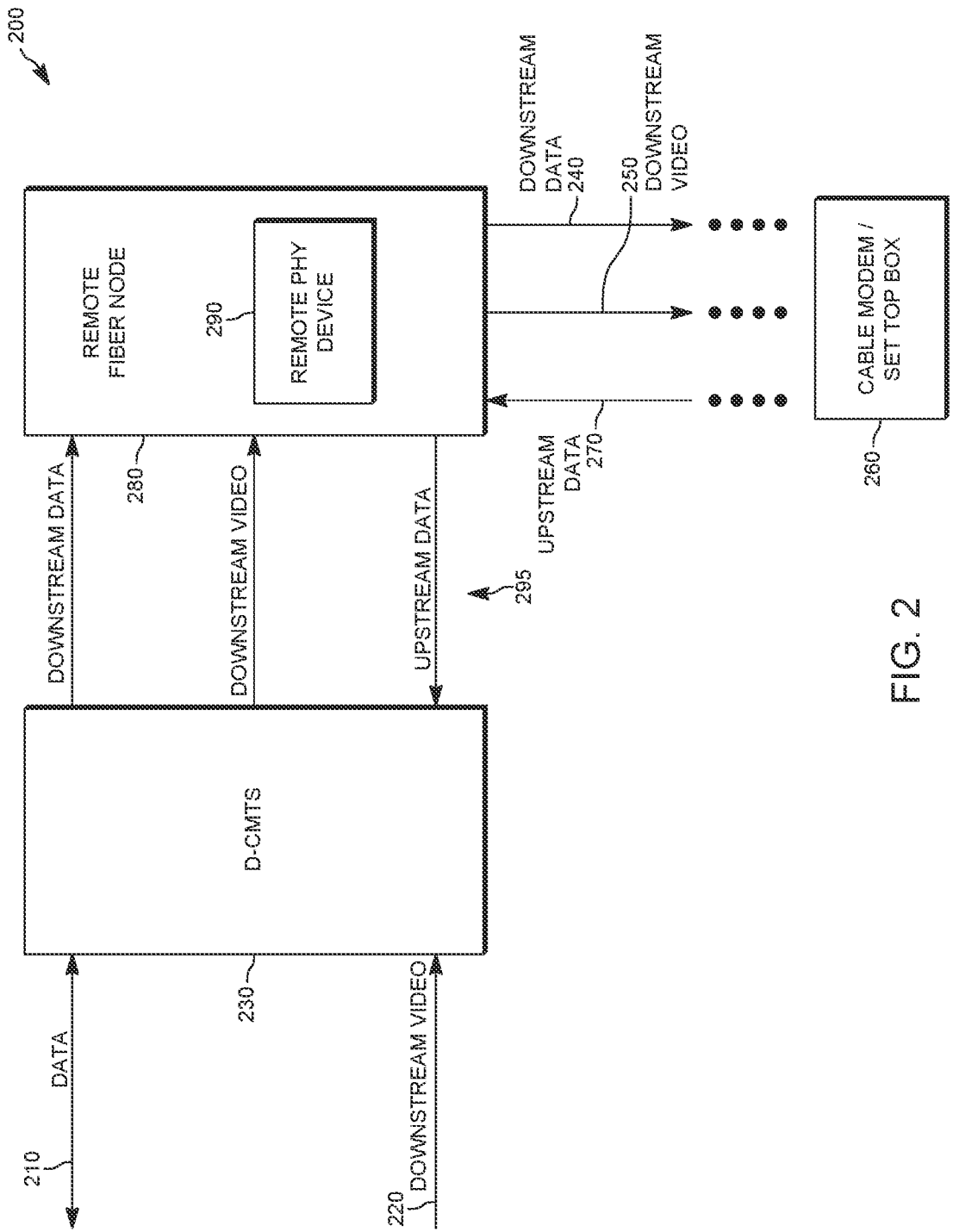
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general the R-PHY often includes the MAC and/or PHY layers of a portion of the system. The D-CMTS 200 may include a D-CMTS 230 (e.g., core) that includes data 210 that is sent and received over the Internet (or other network) typically in the form of packetized data. The D-CMTS 230 may also receive downstream video 220, typically in the form of packetized data from an operator video aggregation system. The D-CMTS 230 receives and processes the received data 210 and downstream video 220. A remote fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or analog optics, to digital for transmission to the D-CMTS 230. As it may be observed, depending on the particular configuration, the R-PHY may move all or a portion of the DOC SIS MAC and/or PHY layers down to the fiber node.

Figure 3:
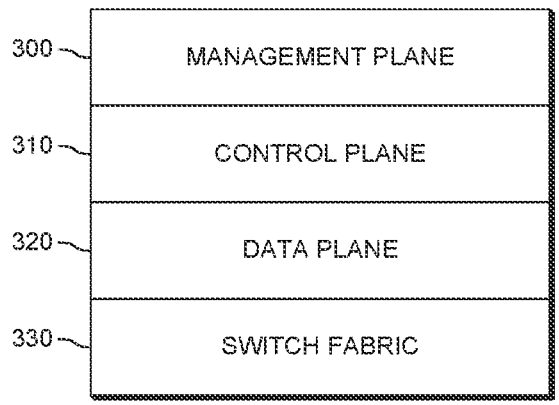
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, and a data plane 320. A switch fabric 330 may be included as part of the layered architecture.

For example, the management plane 300 may be generally considered as the customer interaction or otherwise the general software application being run. The management plane typically configures, monitors, and provides management, monitoring, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

The remote physical device 290 needs to support updating the software of the remote physical device. For example, the D-CMTS 230 may command the remote physical device 290 to reset via a ResetCtrl GCP TLV, such as using a command line interface. For example, the remote physical device 290 may initiate a reset on its own in reaction to some internal or external event.

Figure 4:
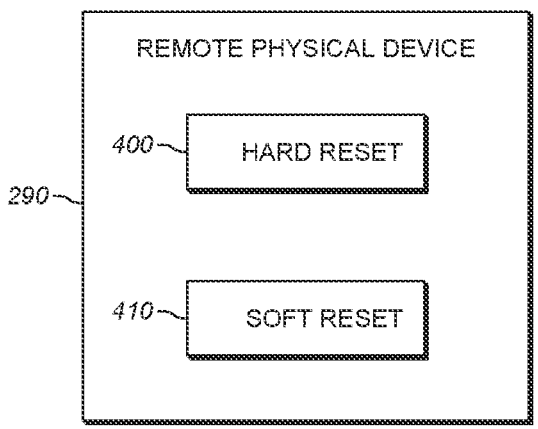
FIG. 4 illustrates types of resets supported by a remote physical device.

Referring to FIG. 4, the remote physical device 290 may include a hard reset 400 which is the most comprehensive form of reset. The hard reset 400 may be thought of as a "reboot" of the device. When the remote physical device 290 performs a hard reset 400, the remote physical device 290 performs a power cycle, or the equivalent thereof, whereupon the remote physical device 290 returns to a state similar to the state achieved on initial power up. The remote physical device 290 retains non-volatile configuration through the hard reset. After the hard reset 400, the remote physical device 290 returns to the beginning of the remote physical device 290 initialization state machine and performs initialization.

The remote physical device 290 may include a soft reset 410 that provides a partial reset of the remote physical device 290. After a soft reset 410, the remote physical device 290 takes steps to hasten the remote physical device 290 initialization process and minimize service interruption. The soft reset 410 resets the remote physical device 290 volatile configuration and operating state, including terminating all connections to all D-CMTSs, releasing IP addresses obtained via DHCP, clearing network authentication information, etc. The remote physical device 290 may reset all software states except that which is needed to maintain IEEE 1588 clock frequency.

The soft reset 410 achieves quicker remote physical device 290 initialization by maintaining the current IEEE 1588 clock frequency without adjustment throughout the soft reset 410 process until it restarts the sync process with the grand master clock (GMC). This allows the remote physical device 290 to provide synchronized operation without having to engage in the time consuming full PTP sync process with the GMC.

Figure 5:
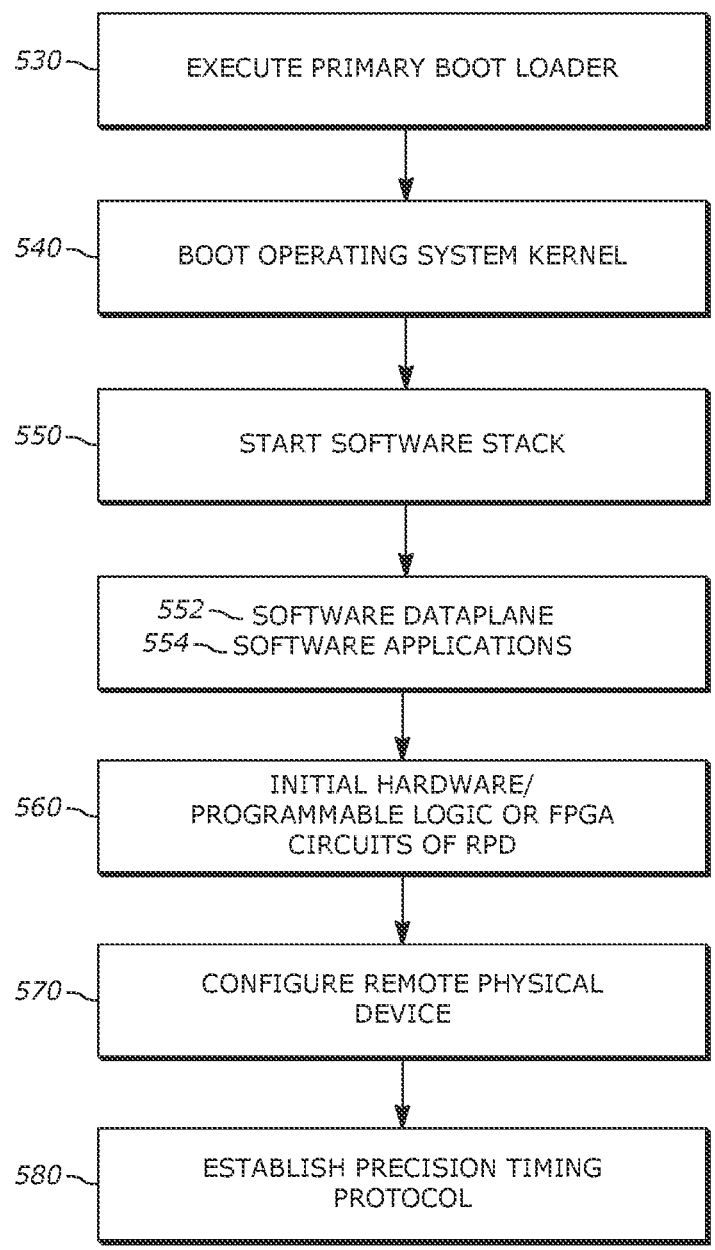
FIG. 5 illustrates a hard reset process for a remote physical device.

Referring to FIG. 5, the hard reset 400 undergoes a time consuming process that generally requires 4-5 minutes during which service for the customer is not provided by the remote physical device 290. The hard reset 400 process tends to vary from remote physical device to remote physical device, but in general, the D-CMTS 230 downloads an image file (.ITB) that includes a FPGA image, a Uboot (Boot.bin), a Linux Kernel, and all applications and software dataplane. The remote physical device 290 then executes the primary boot loader 530 that includes instructions to boot the remote physical device's 290 operating system kernel. The operating system kernel 540 is booted and then the software stack is started 550. The software stack 550 includes a software dataplane 552 and a plurality of software applications 554. After starting the software stack 550, the remote physical device 290 initializes the hardware 560 (e.g., initialize hardware/programmable logic or FPGA circuits of RPD). After the hardware initializes 560, the remote physical device 290 connects with the D-CMTS 230 to be configured 570 and precision timing protocol 580 is established. The FPGA and other electronic circuits are generally referred to herein as a processor.

Figure 6:
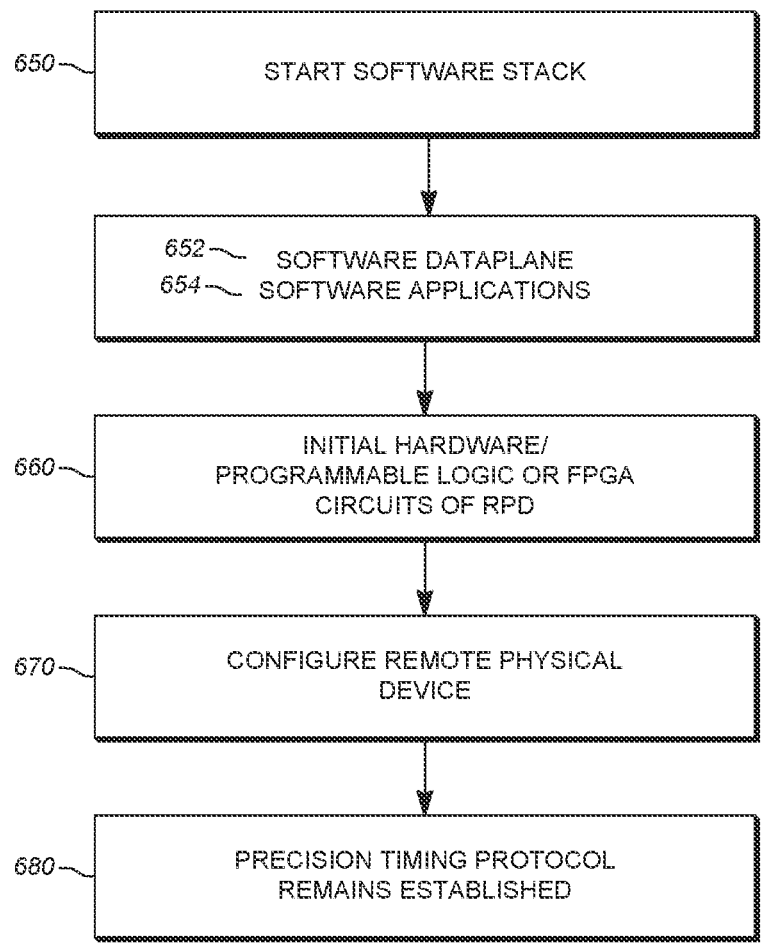
FIG. 6 illustrates a soft reset process for a remote physical device.

Referring to FIG. 6, the soft reset 410 omits downloading the imagefile (.ITB), omits resetting remote physical device, omits loading the entire image file (.ITB), omits executing the primary boot loader, and omits booting operating system kernel. The soft reset 410 undergoes a somewhat time consuming process that requires generally 60 seconds where service for the customer is not provided by the remote physical device 290. The soft reset 410 may include starting the software stack 650 which includes a software dataplane 652 and a plurality of software applications 654. After starting the software stack 650, the remote physical device 290 initializes the hardware 660 (e.g., initialize hardware/programmable logic or FPGA circuits of RPD). After the hardware initializes 660, the remote physical device 290 connects with the D-CMTS 230 to be configured 670 and precision timing protocol 680 is established.

In the case of either the hard reset or the soft reset, the video service, data service, out-of-band data service, etc. are impacted because the reset process kills all applications including the software dataplane. During the reset process the remote physical device 290 re-establishes the GCP ("generic control plane" is a protocol used for configuration of the remote physical device) and the L2TP (layer two tunnelling protocol) connections from scratch. Also during the reset process of the remote physical device 290, the software dataplane is restarted and reprogrammed. Further, the FPGA dataplane modulator is reprogrammed.

When the remote physical device 290 is restarted, either as a result of a hard reset or a soft reset, the processing of video content, data service, and out-of-band data does not restart until after the configuration is processed and the precision timing protocol is established or maintained. Unfortunately, for a hard reset this process typically takes 4-5 minutes to complete. In most cases, resetting the remote physical device, executing the primary boot loader, downloading of the image file (.ITB) file, and booting operating system kernel is not necessary because those portions of the remote physical device 290 remain operational. In most cases, if updating is required only the software stack 650 which includes the software dataplane 652 and the plurality of software applications 654 is modified. After modification of the software stack 650, the remote physical device 290 initializes the hardware 660 and connects with the D-CMTS 230 to be configured 670 and establish the precision timing protocol 680.

Figure 7:
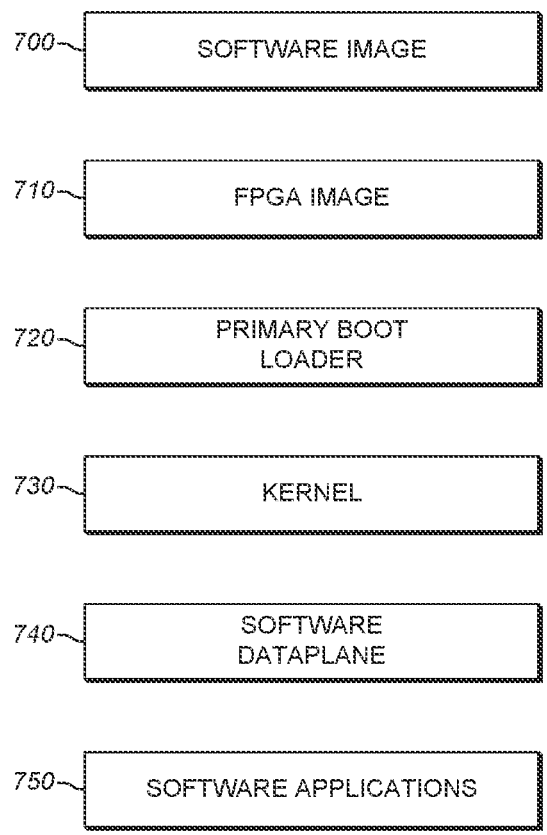
FIG. 7 illustrates a software image and components thereof.

Unfortunately, the hard reset process typically requires over 4-5 minutes to complete and the soft reset process typically requires over a minute to complete, during which time services for customers are not available. A modified process is desirable to reduce the impact on the currently active services both from the perspective of the remote physical device and the perspective of the D-CMTS. To achieve a reduction in the unavailability of active services during the reset process, it is desirable to modify the image file that is downloaded to the remote physical device 290 includes multiple different portions therein. Referring to FIG. 7, the software image may be in the form of an image tree blob (.ITB) file format. The software image 700 may include a FPGA image 710 (e.g., a bitstream, configuration data), a primary boot loader 720 (e.g., Uboot), a kernel 730 (e.g., Linux), a software dataplane 740, and/or software applications 750. In this manner, the software image may include selected portions of the overall system for updating the remote physical device 290. While providing selected portions over the overall system for the remote physical device 290 is beneficial, it is also desirable for the software image 700 to indicate those portions of the image file, such as the FPGA image 710, the primary boot loader 720, the kernel 730, the software dataplane 740, and/or the software applications 750, inclusive of portions thereof, that have been modified from the previous over software image (multiple software images in the case of the overall configuration is included among multiple software images) that was provided to the remote physical device 290.

Figure 8:
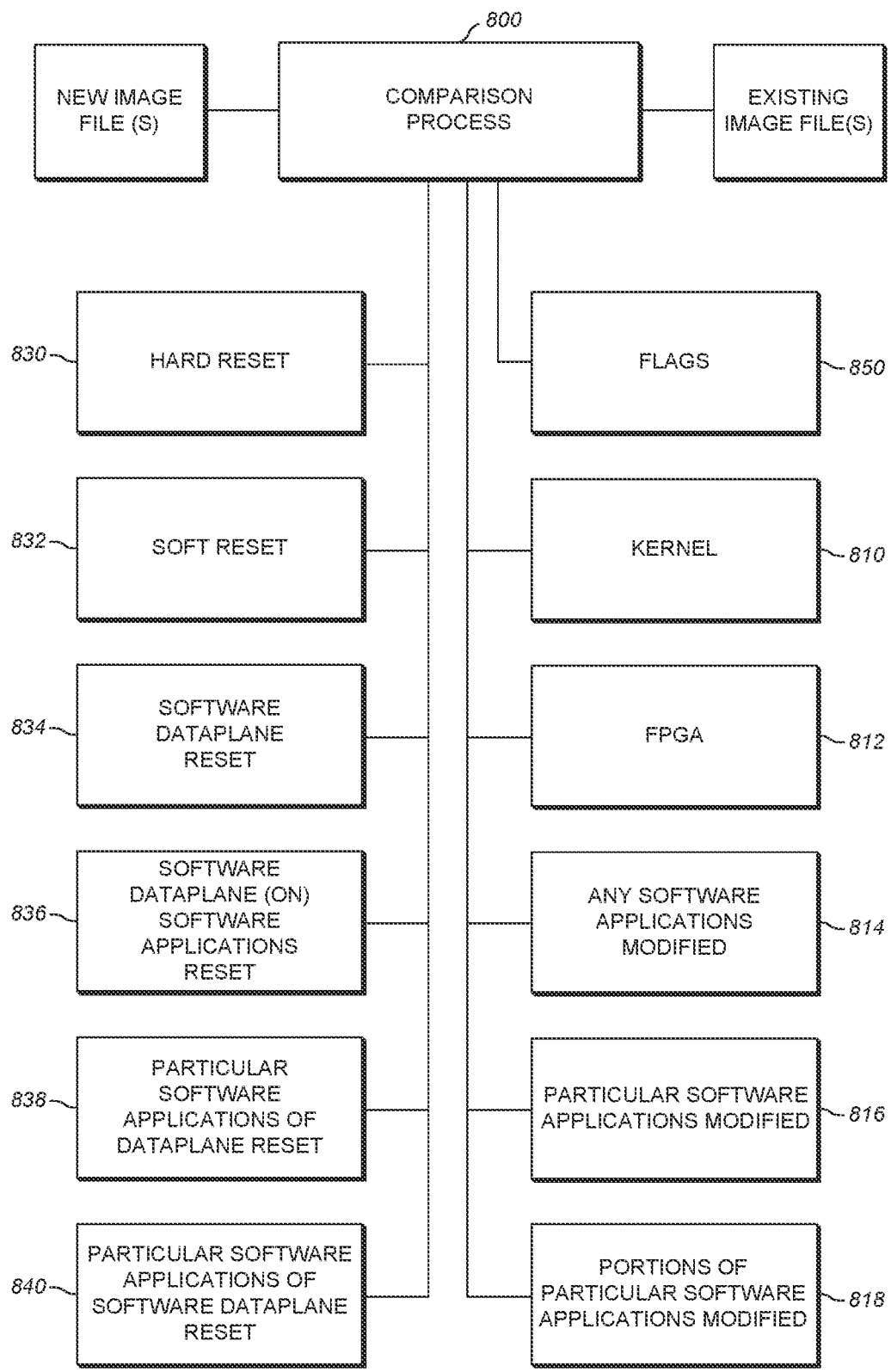
FIG. 8 illustrates a comparison process to identify modified components of the image files and the type of reset process to undertake.

Referring to FIG. 8, when packaging the software image 700 for the remote physical device 290, a comparison 800 is made to identify those portions that are different from one or more previous image files installed on the remote physical device 290. For example, the comparison 800 may identify whether the Kernel 810 has been modified, whether the FPGA has been modified 812, whether any of the software applications have been modified 814, whether any particular software application has been modified 816, and the portions of any particular software application that has been modified 818. In addition, the comparison 800 may further identify the type of reset that would be appropriate based upon the modification, such as, a hard reset 830, a soft reset 832, a software dataplane of the dataplane reset 834, a software dataplane and software applications reset 836, particular software applications of the software dataplane of the dataplane reset 838, particular software applications of the software dataplane and software applications reset 840. The packaging of the image may include one or more flags 850 included within the package to indicate the manner in which the image should be installed. For a Linux distribution, the image file is all or part of the root file system. It is noted that the image file may include sub-image files included therein. The reset may, for example, be a reset of the entire device. The reset may, for example, be a reset of all of the software applications running on the FPGA. The reset may, for example, be a reset of a selected set of one or more software applications running on the FPGA. The reset may, for example, be a reset of one of the software applications running on the FPGA, which does not impact the services provided to the user. In this manner, only selected portions of the system may be dynamically updated based upon the flags. In addition, the type of reset process that occurs may be based upon the nature of the changed or otherwise indicated based upon the flags. It is to be understood that the flag may be any type of indictor, such as a single bit, a string, a set of bits, or otherwise. It is further noted that during the comparison of the ITB files, the system may use MD5 hash values to determine which sub-images have changed, where the MD5 hash values may be calculated during built time.

As previously described to reduce the impact on services it was determined that if there is an error in the dataplane, then the software dataplane should be updated (if necessary) and restarted in an effective manner. If there is an error in the software applications, then one or more of the software applications should be updated (if necessary) and restarted in an effective manner.

The soft reset process, the hard reset process, and/or any modified reset processes may be initiated in any suitable manner. For example, initiation may be through a command line interface, a command from the D-CMTS, and/or the remote physical device in the event of a failure such as a software crash, a watchdog timeout, a software upgrade, etc.

As previously noted, the process by which the image files are built may be modified to include the ability to do the comparisons and include the flags therein. The remote physical device parses the image file to determine the appropriate manner of loading the parts of the image file based upon the flags and installing them on the remote physical device.

It is noted that the process by which an image file is flagged or otherwise changes are identified in the image file may be used for other applications, apart from the remote physical device, and apart from the cable networking environment.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A distribution system that includes a head end connected to a plurality of customer devices through a transmission network that includes a node that converts digital data to data suitable for said plurality of customer devices, where said node includes a processor, wherein said processor performs the following steps: (a) said node receiving a single image file including (i) kernel software, (ii) hardware configuration data, and (iii) application software; (b) said node parsing said image file that includes said (i) kernel software, said (ii) hardware configuration data, and (iii) said application software to determine portions of said image file that have been indicated by at least one flag as being modified from that which is currently installed on said node, and determine portions of said image file that have been indicated by said at least one flag as not being modified from that which is currently installed on said node; (c) said node installing at least portions of said image file on said node as indicated by said at least one flag as being modified and resetting portions of said node based upon said at least one flag as being modified; (d) said node not installing other portions of said image file on said node that have been indicated by said at least one flag as not being modified from that which is currently installed on said node where said node receives said other portions of said image file together with said image file; (e) wherein said node is configured to provide services to said plurality of customer devices independently of whether any other said node is configured to provide services to said plurality of customer devices; (f) wherein said installing at least a portion of said image file on said node results in a service interruption to said plurality of customer devices provided by said node.

2. The cable distribution system of claim 1 further comprising said node resetting software applications in a control plane.

3. The cable distribution system of claim 2 further comprising modifying at least one of said software applications as a result of resetting said node.

4. The cable distribution system of claim 1 further comprising modifying said software dataplane as a result of resetting said node.

5. The cable distribution system of claim 1 further comprising said node resetting software applications in a software dataplane.

6. The cable distribution system of claim 1 further comprising a hard reset of said node.

7. The cable distribution system of claim 1 further comprising a soft reset of said node.

8. A method for updating an embedded device that includes a processor, comprising the steps of: (a) said embedded device receiving a single image file including (i) kernel software, (ii) hardware configuration data, and (iii) application software; (b) said embedded device parsing said image file that includes said (i) kernel software, said (ii) hardware configuration data, and (iii) said application software to determine portions of said image file that have been indicated by at least one flag as being modified from that which is currently installed on said embedded device, and determine portions of said image file that have been indicated by said at least one flag as not being modified from that which is currently installed on said node; (c) said embedded device installing at least portions of said image file on said embedded device as indicated by said at least one flag as being modified and resetting portions of said embedded device based upon said at least one flag as being modified; (d) said embedded device not installing other portions of said image file on said embedded device that have been indicated by said at least one flag as not being modified from that which is currently installed on said embedded device where said embedded device receives said other portions of said image file together with said image file; (e) wherein said device is configured to provide services to said plurality of customer devices independently of whether any other said device is configured to provide services to said plurality of customer devices; (f) wherein said installing at least a portion of said image file on said device results in a service interruption to said plurality of customer devices provided by said device.

9. The method of claim 8 further comprising said embedded device resetting software applications in a control plane.

10. The method of claim 9 further comprising modifying at least one of said software applications as a result of resetting said embedded device.

11. The method of claim 8 further comprising modifying said software dataplane as a result of resetting said embedded device.

12. The method of claim 8 further comprising said embedded device resetting software applications in a software dataplane.

13. The method of claim 8 further comprising a hard reset of said embedded device.

14. The method of claim 8 further comprising a soft reset of said embedded device.

\* \* \* \* \*